(12) United States Patent
Rogers

(10) Patent No.: US 11,658,839 B2
(45) Date of Patent: May 23, 2023

(54) NETWORK SYSTEM FOR SMART DEVICES

(71) Applicant: EATON INTELLIGENT POWER LIMITED, Dublin (IE)

(72) Inventor: Brandon Jeremy Rogers, Senoia, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 170 days.

(21) Appl. No.: 17/195,974

(22) Filed: Mar. 9, 2021

(65) Prior Publication Data

US 2022/0294658 A1    Sep. 15, 2022

(51) Int. Cl.
*H04L 12/28* (2006.01)

(52) U.S. Cl.
CPC .. *H04L 12/2803* (2013.01); *H04L 2012/2841* (2013.01)

(58) Field of Classification Search
CPC ............... H04L 12/2803; H04L 2012/2841
See application file for complete search history.

(56) References Cited

U.S. PATENT DOCUMENTS

| | | | | |
|---|---|---|---|---|
| 7,099,295 | B1* | 8/2006 | Doyle | H04W 88/08 370/338 |
| 8,856,633 | B2* | 10/2014 | Lakkis | H04L 1/1835 714/712 |
| 10,117,286 | B1* | 10/2018 | Jorgovanovic | H04B 17/318 |
| 2010/0041333 | A1* | 2/2010 | Ungari | H02J 50/10 455/66.1 |
| 2012/0099594 | A1* | 4/2012 | Lau | H04L 12/2807 370/392 |
| 2015/0326774 | A1* | 11/2015 | Chinery, III | H04N 7/185 348/207.1 |
| 2016/0353296 | A1* | 12/2016 | Zhao | H04W 88/06 |

* cited by examiner

*Primary Examiner* — Rasheed Gidado
(74) *Attorney, Agent, or Firm* — Eckert Seamans Cherin & Mellott, LLC

(57) ABSTRACT

A system including a first device having a first communication interface structured to communicate via a first communication protocol and a second communication interface structured to communicate via a second communication protocol, and a second device having a first communication interface structured to communicate via the first communication protocol. The first communication protocol is a short range wireless communication protocol and the second communication protocol is a native internet protocol. The first device is structured to receive data from the second device via the first communication protocol and to transmit the received data via the second communication protocol.

17 Claims, 4 Drawing Sheets

NETWORK SYSTEM FOR SMART DEVICES

BACKGROUND

Field

The disclosed concept generally relates to networked devices and network systems. More particularly, the disclosed concept relates to smart home devices and networks.

Background Information

The term smart home generally refers to a residence where one or more devices are connected to a network and are controllable by a user via a control device. Some prior smart homes utilized a specialized gateway device that served as the gateway for the home network. Various smart devices, such as switches and sensors, in the home connect to the home network via the gateway. In many cases, the specialized gateway device is a proprietary device that will only properly work with corresponding smart devices. For example, a manufacturer may sell a specialized gateway device that will only work with certain smart devices also sold by that manufacturer.

Many homes already have an existing wireless network used for connecting computers and other devices to the internet. The home will already have a wireless router used to setup the wireless network. The specialized gateway device sets up a second wireless network. The specialized gateway device is often an expensive device due to it needing the capability to setup its own wireless network. Additionally, if smart devices are spread across a large area, multiple specialized gateway devices may be needed. If one of the specialized gateway devices suffers a failure, the smart devices connected to that specialized gateway device may lose connectivity to the home network. These sorts of issues affect the cost and reliability of smart home systems.

Thus, there is room for improvement in smart home devices and networks.

SUMMARY

These needs and others are met by some example embodiments of the disclosed concept in which a system includes a first device capable of communication via two protocols and a second device capable of communication via one protocol. The first device is structured to pass through data received from the second device via one of the communication protocols via the other communication protocol.

In accordance with an aspect of the disclosed concept, a system comprises: a first device having a first communication interface structured to communicate via a first communication protocol and a second communication interface structured to communicate via a second communication protocol; and a second device having a first communication interface structured to communicate via the first communication protocol, wherein the first communication protocol is a short range wireless communication protocol and the second communication protocol is a native internet protocol, and wherein the first device is structured to receive data from the second device via the first communication protocol and to transmit the received data via the second communication protocol.

In accordance with another aspect of the disclosed concept, a method for communication between devices comprises: providing a first device having a first communication interface structured to communicate via a first communication protocol and a second communication interface structured to communicate via a second communication protocol; providing a second device having a first communication interface structured to communicate via the first communication protocol; receiving, with the first device, data from the second device via the first communication protocol; and transmitting, with the first device, the received data via the second communication protocol, wherein the first communication protocol is a short range wireless communication protocol and the second communication protocol is a native internet protocol.

In accordance with another aspect of the disclosed concept, a system comprises: a plurality of first devices each having a first communication interface structured to communicate via a first communication protocol and a second communication interface structured to communicate via a second communication protocol; and a network management system structured to designate one of the plurality of first devices as a gateway and, in response to an event, to assess the connectivity of the plurality of first devices and promote another one of the plurality of first devices to the gateway.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF PREFERRED EMBODIMENTS

Figure 1:
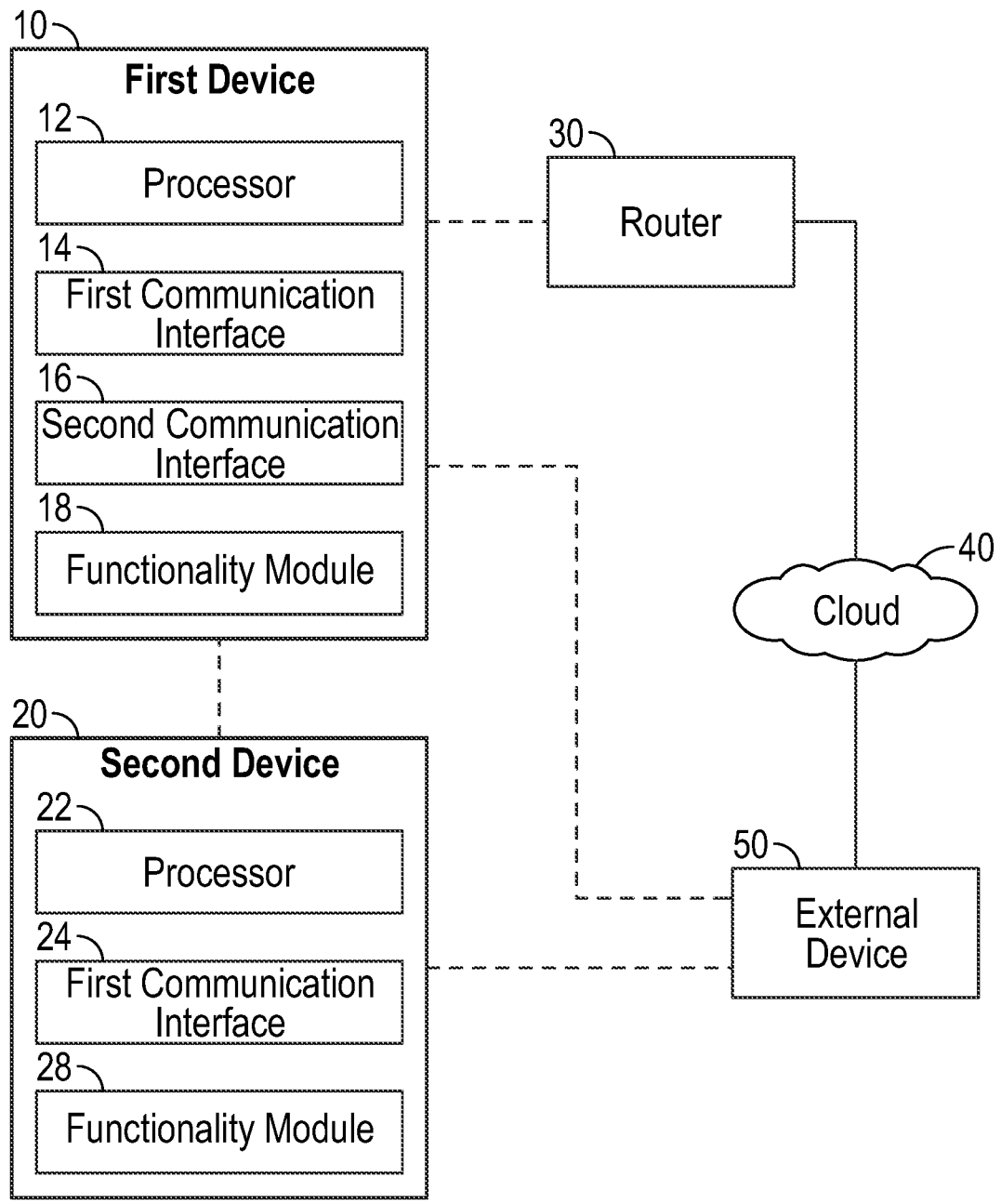
FIG. 1 is a schematic diagram of a network system in accordance with an example embodiment of the disclosed concept.

Directional phrases used herein, such as, for example, left, right, front, back, top, bottom, and derivatives thereof, related to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that two or more parts are "electrically coupled" or are in "electrical communication" shall mean that two or more parts or components are joined together either directly or joined through one or more intermediate parts such that electricity, current, voltage, and/or energy is operable to flow from one part or component to the other part or component, and vice-versa.

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the singular form of "a", "an", and "the" include plural references unless the context clearly dictates otherwise.

FIG. 1 is a schematic diagram of a network system in accordance with an example embodiment of the disclosed concept. The network system includes a first device 10 and a second device 20. The network system further includes a router 30, a network 40, and an external device 50.

The first device 10 includes a processor 12, a first communication interface 14, a second communication interface 16, and a functionality module 18. The first device 10 may be a device that is part of a smart home network. For example and without limitation, the first device 10 may be a dimmer, a switch, a local controller, a gateway, a load-center, etc. The first communication interface 14 is structured to provide communication via a first communication protocol and the second communication interface 16 is structured to provide communication via a second communication protocol. In an example embodiment of the disclosed concept, the first communication protocol is Bluetooth low energy ("BLE") and the second communication protocol is Wi-Fi. However, it will be appreciated that other communication protocols may be employed without departing from the scope of the disclosed concept. For example, the first communication protocol may be any type of short range communication protocol (e.g., without limitation, Bluetooth, ZigBee, Z-wave, etc.) and the second communication protocol may be any type of communication protocol compatible with the router 30.

The processor 12 is structured to control operations of various components of the first device 10. For example and without limitation, the processor 12 is structured to control the first communication interface 14 and the second communication interface 16. For example and without limitation, the processor 12 may control the first communication interface 14 and the second communication interface 16 to wirelessly communicate data. Similarly, the processor 12 may cause data received via the first communication interface 14 and the second communication interface 16 to be stored in a memory (not shown) on the first device 10. In an example embodiment, the processor 12 may cause data received from the second device 20 via the first communication interface 14 to be encapsulated and then control the second communication interface 16 to send the encapsulated data to the router 30.

The functionality module 18 may include one or more components structured to provide a function associated with the first device 10. For example, if the first device 10 is a dimmer, the functionality module 18 may include the circuitry and hardware used to provide a dimming function, if the first device 10 is a switch, the functionality module 18 may include the circuitry and hardware used to provide a switching function, etc.

The second device 20 includes a processor 22, a first communication interface 24, and a functionality module 28. The second device 20 may also be a device that is part of a smart home network. For example and without limitation, the second device 20 may be a sensor, a switch, a circuit breaker, etc. The first communication interface 14 is structured to provide communication via the same first communication protocol used by the first communication interface 14 of the first device 10. In an example embodiment, the first communication protocol is BLE. However, it will be appreciated that other communications protocols may be employed such as, for example and without limitation, any type of short range wireless communication protocol (e.g., without limitation, Bluetooth, ZigBee, Z-wave, etc.).

The processor 22 is structured to control operations of various components of the second device 20. For example and without limitation, the processor 22 is structured to control the first communication interface 24. For example and without limitation, the processor 22 may control the first communication interface 24 to wirelessly communicate data. Similarly, the processor 22 may cause data received via the first communication interface 14 to be stored in a memory (not shown) on the second device 20. In an example embodiment, the processor 22 may cause data to be sent to the first device 10 via the first communication interface 24

The functionality module 28 may include one or more components structured to provide a function associated with the second device 20. For example, if the second device 20 is a sensor, the functionality module 28 may include the circuitry and hardware used to provide a sensing function, if the second device 20 is a switch, the functionality module 28 may include the circuitry and hardware used to provide a switching function, etc.

The router 30 may be any type of router conventionally known to those having ordinary skill in the art. The router 30 may communicate with the first device 10 via the first communication interface 14. The router 30 may communicate data received from the first device 10 via the network 40 to the external device 50 or to other devices connected to the network 40. The network 40 may be, for example, the internet.

The external device 50 may be an electronic device structured to communicate over the network 40. In some example embodiments, the external device 50 may be a computing device, such as, for example and without limitation, a computer, a tablet, a mobile phone, or other such devices, structured to run an application. The application may, for example and without limitation, allow the external device 50 to communicate and manage the first and second devices 10,20. In some example embodiments, the external device 50 may be structured to communicate with the first and second devices 10,20 using the first communication protocol. For example and without limitation, the external device 50 may communicate with the first and second devices 10,20 using the first communication protocol for the initial setup of the devices. Once the first and second devices 10,20 are initially setup, the external device 50 may then communicate with the first and second devices 10,20 via the network 40. When communicating with the first and second devices 10,20 via the network 40, the external device 50 need not be in the vicinity of the first and second devices 10,20, but rather just must be capable of connecting to the network 40.

In an example embodiment of the disclosed concept, the first communication protocol is a short range wireless communication protocol such as BLE and the second communication protocol is an internet protocol (IP) native protocol, such as Wi-Fi. The first device 10 is capable of communicating via both the first and second communication protocols while the second device 20 is only capable of communicating via the first communication protocol. The capability to provide an IP native protocol is more costly and uses more power than a short range wireless communication protocol such as BLE. Using an IP native protocol is not ideal for battery powered devices. In an example embodiment of the disclosed concept, the first device 10 is a line powered device while the second device 20 is a battery powered device. For example, in a smart home system the first device 10 may be a dimmer, which is usually line powered while the second device 20 may be a sensor, which is usually battery powered. While this is just an example of the type of devices the first and second devices 10,20 may be, it will be appreciated that the first and second devices 10,20 may be embodied as other devices without departing from the scope of the disclosed concept.

In an example embodiment of the disclosed concept, the first device 10 is structured to act as a gateway for the second device 20. For example, the first device 10 is capable of communicating via an IP native protocol and, thus, is able to connect to the network 40 via the router, while the second device 20 is not able to make such a connection directly. Rather, the second device 20 connects to the first device 10 using the first communication protocol and the first device 10 acts as a gateway for the second device 20. For example, the first device 10 encapsulates data received from the second device 20 and communicates it to the network 40 using the second communication protocol. Similarly, when the external device 50, or other devices want to communicate with the second device 20 via the network 40, the communication is first received by the first device 10 with the second communication protocol, and is then passed through to the second device 20 using the first communication protocol. To the external devices 50, or other devices, it will appear as if they are communicating directly with the second device 20, even though the second device 20 is not itself capable of connecting to the network 20. In this type of system, connectivity is able to be established with an existing home network, while the cost and power requirements are limited. For example, the cost and power requirements would be increased if the second device 20 were required itself to be able to connect to the home network.

Figure 2:
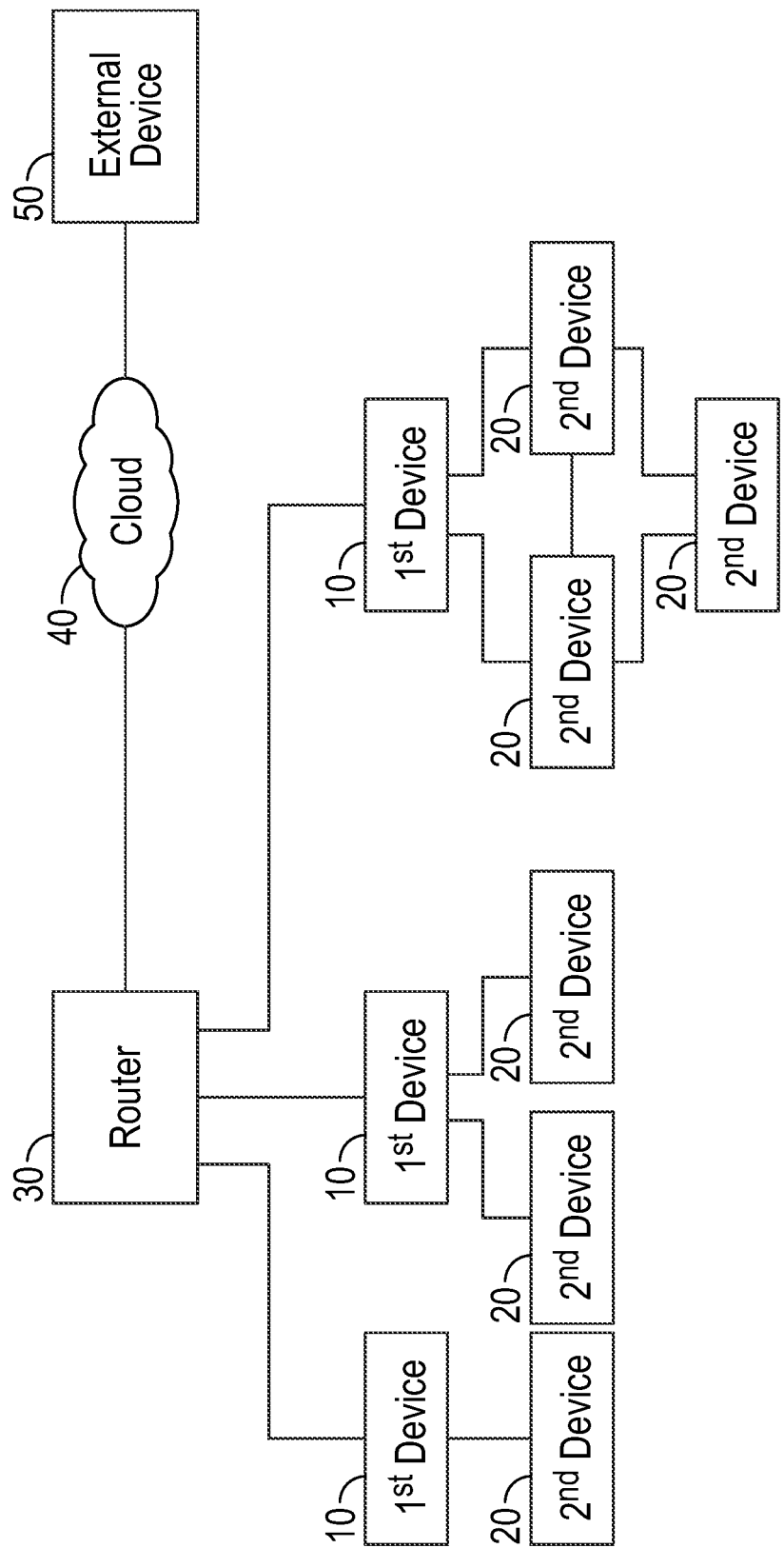
FIG. 2 is a schematic diagram of a more complex network system in accordance with an example embodiment of the disclosed concept.

FIG. 2 is a schematic diagram of another network system in accordance with an example embodiment of the disclosed concept. The network system in FIG. 2 includes the first device 10, the second device 20, the router 30, the network 40, and the external device 50, similar to those described with respect to FIG. 1. However, in FIG. 2, there are multiple first and second devices 10,20. It will be appreciated that multiple first devices 10 may be connected to the router 30. It will also be appreciated that multiple second devices 20 may be connected to a selected first device 10.

Additionally, as shown in FIG. 2, it will be appreciated that the second device 20 may be structured to connect to other second devices 20. For example and without limitation, a second device 20 may encapsulate and pass through data received from another second device 20. The second devices 20 may communicate with each other via the first communication protocol. The data may be passed through second devices 20 until it reaches a first device 10 acting as a gateway. The first device 10 will also pass through the data and will communicate it to the router 30 via the second communication protocol, where it can then be communicated over the network 40 to the external device 50 or other devices.

As shown in FIG. 2, there may be a multi-level hierarchy of devices with the first devices 10 forming the top level and generally the second devices 20 forming the lower levels. However, it will be appreciated that one or more first devices 10 (i.e., devices capable of communicating via the first and second communication protocols) may be included in lower levels of hierarchy. In the case that a first device 10 is included in a lower level of the hierarchy, it may communicate using the first communication protocol, similar to a second device 20. The second communication protocol may be disabled to save power.

It will be appreciated that the systems shown in FIGS. 1 and 2 are scalable. First and second devices 10,20 may be added or removed without departing from the scope of the disclosed concept. The external device 50, or another device, may be used in the initial setup of any new devices. Additionally, the external device 50 may be used to manage the system. It will be appreciated that the system may be employed in smart homes and that the first and second devices 10,20 may be types of devices used in smart homes (e.g., without limitation, dimmers, sensors, switches, circuit breakers, load centers, controllers, gateways, etc.). In some example embodiments, the first devices 10 are line powered devices and the second devices 20 are battery powered devices. However, the disclosed concept is not limited thereto. One or more first devices 10 may be battery powered and one or more second devices 20 may be line powered without departing from the scope of the disclosed concept. The disclosed concept may provide a smart home network that is able to connect to an existing internet protocol network in the home while some of its devices take advantage of the cost and power saving of using short range wireless communication protocol, but are still able to connect to the home network via the first devices 10 encapsulating and passing through their communications.

Figure 3:
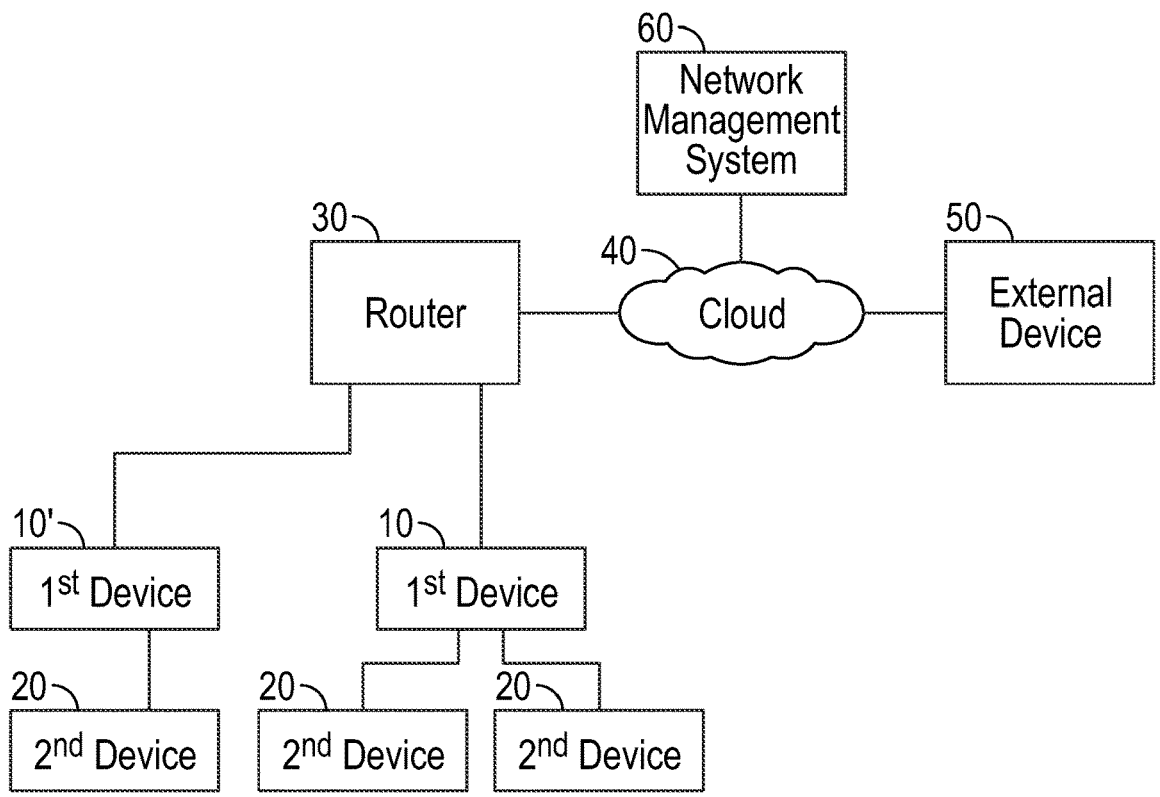
FIG. 3 is a schematic diagram of a network system including a network management system in accordance with an example embodiment of the disclosed concept.
Figure 4:
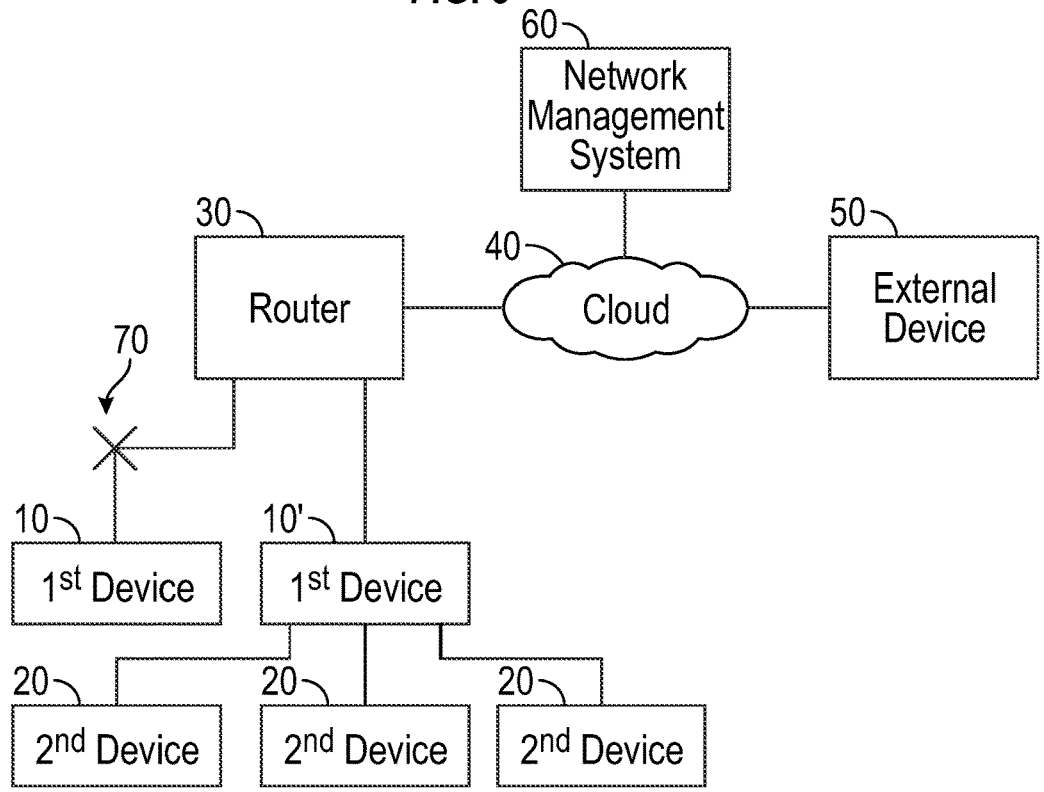
FIG. 4 is a schematic diagram of a network system with a loss of connectivity in accordance with an example embodiment of the disclosed concept.
Figure 5:
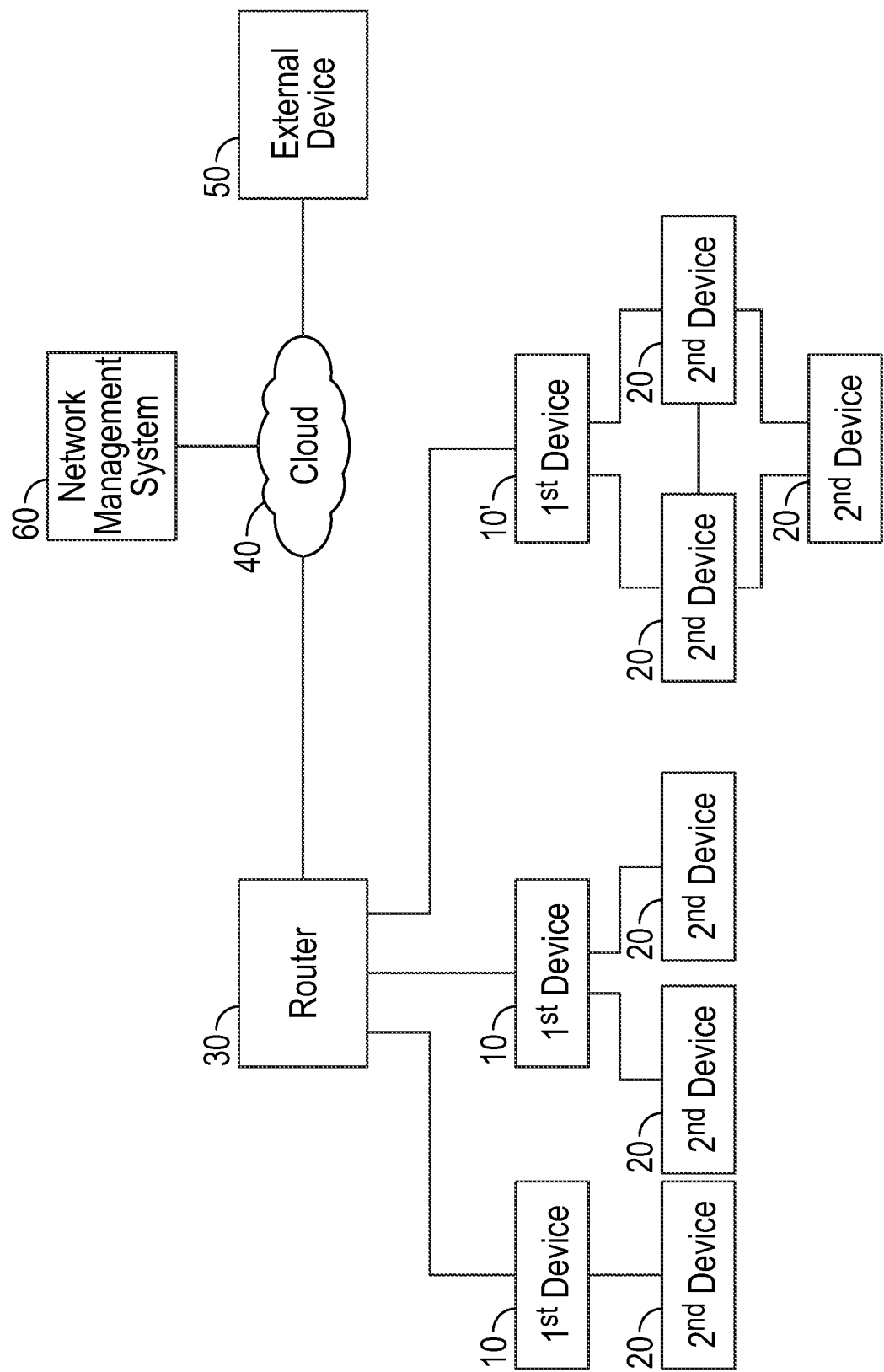
FIG. 5 is a schematic diagram of a network system after an addition of new devices in accordance with an example embodiment of the disclosed concept.

FIG. 3-5 are schematic diagrams of network systems in accordance with example embodiments of the disclosed concept. FIGS. 3-5 illustration reconfiguration of the network system in response to events such as a loss of connection or an addition of a new device.

The network system of FIG. 3 is similar to the network system described with respect to FIG. 2. However, in some example embodiments, one of the first devices 10' is designated as a gateway device. Both first devices 10,10' are capable of communicating with the router 30. However, the first device 10' designated as the gateway is also structured to communicate with the network 40 via the router 30. The first device 10' designated as the gateway will aggregate communications from other first devices 10 and communicate them to the network 40. For example, other first devices 10 may send their communications to the first device 10' designated as the gateway via the router 30. The first device 10' designated as the gateway will then transmit its received communications to the network 40 via the router 30. This configuration of having a single designated gateway device limits the number of devices that communicate with cloud services connected to the network 40. Some billing systems charge by the number of devices that communicate with their services and designating a single gateway device can limit these charges.

The network system of FIG. 3 further includes a network management system 60. The network management system 60 may designate which one of the first devices 10 is designated as the gateway. In FIG. 3, the network management system 60 is shown as connected to the network 40. However, it will be appreciated that the network management system 60 may be located in various different places without departing from the scope of the disclosed concept. For example and without limitation, the network management system 60 may be located in or connected to the router 30, located in or connected to one of the first devices 10, or located in or connected to the external device 50 without departing from the scope of the disclosed concept.

FIG. 4 illustrates an example of a reconfiguration based on a loss of connectivity of the first device 10' designated as the gateway. As shown in FIG. 4, one of the first devices 10 suffered a loss of connectivity 70 with the router 30. In response, the network management system 60 is structured to promote another one of the first devices 10' to the gateway. The network management system 60, one of the first devices 10,10', or an affected second device 20 may then also trigger any second devices 20 connected to the first device 10 that lost connectivity to establish a connection with another first device 10.

FIG. 5 illustrates an example of a reconfiguration based on one or more new devices being added to the network system. For example, when a new device is added to the network system, the network management system 60 may assess the connectivity of the new device to the router 30 compared to other devices. The network management system 60 may be structured to promote the device having the best connectivity to the gateway. For example, as shown in FIG. 5, a new first device 10' has been added which has better connectivity to the router 30 than the existing first devices 10. In this situation, the network management system 60 is triggered to assess the connectivity in response to a new device being added and, in this case, since the new first device 10' has better connectivity with the router 30 than the existing first devices 10, the new first device 10 is promoted to the gateway device.

While some examples of events that may trigger a reconfiguration have been shown, it will be appreciated that other types of events may trigger a reconfiguration. For example, in some embodiments, the network management system 60 may periodically check whether a reconfiguration would be beneficial. It will also be appreciated that the network management system 60 may assess the connectivity levels of second devices 20 as well, and control them to connect to a different first device 10 that they would have better connectivity with.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system comprising:
    a first device having a first communication interface structured to communicate via a first communication protocol and a second communication interface structured to communicate via a second communication protocol; a second device having a first communication interface structured to communicate via the first communication protocol;
    a router structured to communicate with the first device via the second communication protocol and to communicate with a network; and
    an external device structured to communicate with the network,
    wherein the first communication protocol is a short range wireless communication protocol and the second communication protocol is a native internet protocol,
    wherein the first device is structured to receive data from the second device via the first communication protocol and to transmit the received data via the second communication protocol, and
    wherein the external device is structured to receive data from the second device via the first device, the router, and the network.

2. The system of claim 1, wherein the first communication protocol is Bluetooth low energy and the second communication protocol is Wi-Fi.

3. The system of claim 1, wherein the first device is line powered and the second device is battery powered.

4. The system of claim 1, wherein the external device is structured to communicate with the first device and the second device using the first communication protocol.

5. The system of claim 1, wherein the network is an internet protocol network.

6. The system of claim 1, wherein the external device is at least one of a computer, a tablet, and a mobile phone.

7. The system of claim 1, wherein the first device is at least one of a dimmer, a switch, a controller, a gateway, and a load center.

8. The system of claim 1, wherein the second device is at least one of a sensor, a switch, and a circuit breaker.

9. A method for communication between devices, the method comprising:
    providing a first device having a first communication interface structured to communicate via a first communication protocol and a second communication interface structured to communicate via a second communication protocol;
    providing a second device having a first communication interface structured to communicate via the first communication protocol;
    providing a router structured to communicate with the first device via the second communication protocol and to communicate with a network;
    providing an external device structured to communicate with the network;
    receiving, with the first device, data from the second device via the first communication protocol;
    transmitting, with the first device, the received data via the second communication protocol; and
    receiving, with the external device, data from the second device via the first device, the router, and the network,
    wherein the first communication protocol is a short range wireless communication protocol and the second communication protocol is a native internet protocol.

10. The method of claim 9, wherein the first communication protocol is Bluetooth low energy and the second communication protocol is Wi-Fi.

11. The method of claim 9, wherein the first device is line powered and the second device is battery powered.

12. The method of claim 9, wherein the external device is structured to communicate with the first device and the second device using the first communication protocol.

13. The method of claim 9, wherein the network is an internet protocol network.

14. The method of claim 9, wherein the external device is at least one of a computer, a tablet, and a mobile phone.

15. The method of claim 9, wherein the first device is at least one of a dimmer, a switch, a controller, a gateway, and a load center.

16. The method of claim 9, wherein the second device is at least one of a sensor, a switch, and a circuit breaker.

17. A system comprising:
- a plurality of first devices each having a first communication interface structured to communicate via a first communication protocol and a second communication interface structured to communicate via a second communication protocol;
- a network management system structured to designate one of the plurality of first devices as a gateway and, in response to an event, to assess the connectivity of the plurality of first devices and promote another one of the plurality of first devices to the gateway;
- a plurality of second devices having a first communication interface structured to communicate via the first communication protocol;
- a router structured to communicate with the plurality of first devices via the second communication protocol and to communicate with a network; and
- an external device structured to communicate with the network,
- wherein the first communication protocol is a short range wireless communication protocol and the second communication protocol is a native internet protocol,
- wherein at least one of the first devices is structured to receive data from at least one of the second devices via the first communication protocol and to transmit the received data from the at least one of the second devices via the second communication protocol, and
- wherein the external device is structured to receive data from the at least one of the second devices via the at least one of the first devices, the router, and the network.

* * * * *